(12) United States Patent
Blonde et al.

(10) Patent No.: US 10,003,790 B2
(45) Date of Patent: Jun. 19, 2018

(54) METHOD OF ADAPTING 3D CONTENT TO AN OBSERVER WEARING PRESCRIPTION GLASSES

(71) Applicant: THOMSON LICENSING, Issy de Moulineaux (FR)

(72) Inventors: Laurent Blonde, Thorigne-Fouillard (FR); Sylvain Thiebaud, Noyal sur Vilaine (FR); Didier Doyen, La Bouexier (FR)

(73) Assignee: Thomson Licensing (FR)

( * ) Notice: Subject to any disclaimer, the term of this patent is extended or adjusted under 35 U.S.C. 154(b) by 240 days.

(21) Appl. No.: 14/411,404

(22) PCT Filed: Jun. 24, 2013

(86) PCT No.: PCT/EP2013/063150
§ 371 (c)(1),
(2) Date: Dec. 26, 2014

(87) PCT Pub. No.: WO2014/001262
PCT Pub. Date: Jan. 3, 2014

(65) Prior Publication Data
US 2015/0373323 A1    Dec. 24, 2015

(30) Foreign Application Priority Data
Jun. 26, 2012 (EP) .................................... 12305741

(51) Int. Cl.
*H04N 13/04* (2006.01)
*H04N 13/00* (2018.01)

(52) U.S. Cl.
CPC ......... *H04N 13/30* (2018.05); *H04N 13/0022* (2013.01); *H04N 13/0033* (2013.01);
(Continued)

(58) Field of Classification Search
CPC ....... H04N 13/0022; H04N 2013/0081; H04N 13/04; H04N 13/0033
(Continued)

(56) References Cited

U.S. PATENT DOCUMENTS

| 5,894,464 A | 4/1999 | Kim et al. |
| 2005/0190180 A1 | 9/2005 | Jin et al. |

(Continued)

FOREIGN PATENT DOCUMENTS

| CN | 1180891 | 5/1998 |
| CN | 1643939 | 7/2005 |

(Continued)

OTHER PUBLICATIONS

Hess et al: "Computer Binocular Kit: The Return", Cybernetic vision, 1996, Proceedings., Second Workshop on Sao Carlos, IEEE Comput. Soc, US, Dec. 9, 1996, pp. 131-133.

(Continued)

*Primary Examiner* — Nguyen Truong
(74) *Attorney, Agent, or Firm* — Jakc Schwartz & Associates, PLLC

(57) ABSTRACT

The invention consists in a method of and a device for adapting 3D content to an observer wearing prescription glasses. The method comprises the step of—providing information about prescription glasses of the observer;—calculating a value representative of the optical deviation created by the glasses from the provided information, for a given direction;—estimating a depth adjustment value as a function of the calculated value and—modifying the depth of the 3D content according to the estimated depth adjustment value.

14 Claims, 2 Drawing Sheets

(52) U.S. Cl.
CPC ........... *H04N 13/04* (2013.01); *H04N 13/128* (2018.05); *H04N 13/144* (2018.05); *H04N 2013/0081* (2013.01)

(58) Field of Classification Search
USPC .......................................................... 348/42
See application file for complete search history.

(56) References Cited

U.S. PATENT DOCUMENTS

| | | | | |
|---|---|---|---|---|
| 2006/0232584 | A1* | 10/2006 | Utsugi | G06T 15/10 345/426 |
| 2007/0200927 | A1* | 8/2007 | Krenik | A61B 3/032 348/47 |
| 2008/0192112 | A1* | 8/2008 | Hiramatsu | H04N 13/0003 348/51 |
| 2011/0074933 | A1 | 3/2011 | Held et al. | |
| 2011/0102558 | A1* | 5/2011 | Moliton | H04N 13/0022 348/54 |
| 2011/0261314 | A1 | 10/2011 | Park | |
| 2012/0293642 | A1* | 11/2012 | Berini | G06F 21/32 348/77 |

FOREIGN PATENT DOCUMENTS

| | | |
|---|---|---|
| EP | 1901564 | 3/2008 |
| EP | 2309310 | 4/2011 |
| EP | 2357835 | 8/2011 |
| JP | 2003284093 | 10/2003 |

OTHER PUBLICATIONS

Kawai et al: "Examination of a stereoscopic 3-D display system using a correction lens"; Stereoscopic Displays and Virtual Reality System; X/ 5006: pp. 254-262; 2003.

Shibata et A_: "Stereoscopic 3-D Display With Optical Correction for the Reduction of the Discrepency Between Accomodation and Convergence"; Journal of the Society for Information Display, 13(8): pp. 665-671; Aug. 2005.

Search Report dated Aug. 19, 2013.

* cited by examiner

METHOD OF ADAPTING 3D CONTENT TO AN OBSERVER WEARING PRESCRIPTION GLASSES

This application claims the benefit, under 35 U.S.C. § 365 of International Application PCT/EP2013/063150, filed Jun. 24, 2013, which was published in accordance with PCT Article 21(2) on Jan. 3, 2014 in English and which claims the benefit of European patent application No. 12305741.6, filed Jun. 26, 2012.

The invention relates to the adaptation of 3D content to an observer wearing prescription glasses, considering the influence of prescription glasses characteristics on ocular fatigue.

This invention relates to a 3D content in the 3DTV and 3D Displays domain.

It is widely noticed that the 3D experience varies from one person to another. More specifically, a part of variations comes from the usage of prescription glasses worn by observers to correct myopia or hyperopia for instance as prescription glasses have locally a prismatic effect and thus modify the perception of directions in space.

Combined with the eye lenses, glasses lenses form a thick optical system modifying the field of view of the observers, and consequently the eye gaze excursion to explore a scene.

Compared to wearing contact lenses, observers are in a different perception state in which eye movements needed to explore the same scene are modified in their amplitude.

Today in the majority of cases there is no adjustment of the content depending of prescription glasses worn by observers. Content shot for 3D Cinema is just replicated on DVD/BD with exactly the same pictures.

Scientific projects explore transformations to modify the content depending on the presentation geometry and several solutions are compared on the basis of psycho-visual or statistical tests. Average solutions (i.e. solutions for observers having emmetropic eyes) will emerge out of these studies, taking account of parameters such as the inter-ocular distance, the observer distance to the screen and 3DTV size. Potentially content characteristics such as closest or furthest presented object in the scene are taken into account, too.

Observer characteristics are not exploited in the envisaged content transformations.

To reduce fatigue, adaptation of the 3D content can be proposed. Such adaptation are view interpolation methods.

The goal of the method of the invention is to improve quality of experience for observers wearing corrective glasses with a better estimate of their potential ocular fatigue relative to an average observer. An improved 3D content adaptation process will take into account their visual correction characteristics.

These characteristics can be estimated from their prescription glasses formulas and are data specific to each viewer. Data relative to each viewer can be stored in a memory of the corresponding 3DTV, or a related device, as personal parameters. The viewer can be identified by automatic or interactive means.

The objective of the invention is to avoid under-attenuation or over-attenuation of the 3D strength for observers with prescription glasses. For reminders, the 3D strength is a criterion linked to the left-right image disparity. Indeed the 3D strength corresponds to the strength of the depth effect perceived by an observer. Therefore, when an observer is presented a 2D content, with no left-right disparity, it means that the 3D strength is null, and when he watches a 3D content, the deeper a scene appears to be, the stronger the 3D strength value is.

For a category of observers, under-attenuation of the 3D strength adaptation would leave cause of annoyance and fatigue due to still exaggerated eye convergence or divergence stimulation. For another category of observers over-attenuation of the 3D strength adaptation would diminish unduly their quality of experience when observing a 3D movie (overly flattened scene).

Thus the invention consists in a method of adapting 3D content to an observer wearing prescription glasses. The method of the invention comprises the steps of providing information about prescription glasses of the observer, evaluating the stimulation amplitude corresponding to the provided information, determining the 3D strength variation of the 3D content as a function of the evaluated stimulation amplitude and modifying the depth of the 3D content according to the predicted 3D strength variation.

Adapting 3D content depending on prescription glasses characteristics will in one case diminish reasons for fatigue or annoyance and in the other case improve the perceived quality of the 3D scene.

According to an aspect of the present invention, the amplitude of the stimulation of over- or under-stimulation is due to the optical deviation created by the glasses and is calculated in angular degrees or is calculated in percentage relative to the optical deviation for a given eye optical chief ray direction with regard to an eyeglass optical axis.

According to an aspect of the invention the 3D strength variation is predicted to compensate for the calculated stimulation amplitude or is determined by a conversion matrix to compensate for the calculated stimulation amplitude.

According to an aspect of the invention the prescription glasses intend to correct myopia of the eye or to correct hyperopia of the eye. The invention can also be useful for people affected by anisometropia.

According to an aspect of the present invention information about prescription glasses of the observer is deduced from the output of face analysis module for determining parameters of eyes correction of the viewer.

Thus the invention does not need to enter extra parameters for a viewer. It is not necessary that the viewer knows his parameter concerning the prescription glass he is wearing as this information will be deduced from the face analysis module.

The above and other aspects of the invention will become more apparent by the following detailed description of exemplary embodiments thereof with reference to the attached drawings in which.

Classically the 3D projection geometry assumes a viewer with bare eyes and a central projection of the 3D scene structure onto a plane figuring the retina (pinhole model).

However, as we will see, inserting prescription glasses on the vision path modifies the light rays' route and invalidates the hypothesis of simple central projection. Simple central projection is no more a correct model for human vision.

The invention intends to take into account the influence of the light path modification by prescription glasses in order to adjust 3D strength adaptation. A better correspondence of the presented 3D video with the observer's natural 3D perception, less effort or fatigue to understand the scene and finally a better satisfaction are expected.

A product using the invention will require information about prescription glasses of an observer as input. This will be for example inquired via a user interface or provided by a user profile. It can also be the output of face analysis software.

The amplitude of the 3D strength adjustment image processing of the invention will depend on the data provided as prescription glasses information.

More details about the influence of corrective glasses on ocular fatigue are given in this paragraph, taking as example glasses correcting a +4 D (diopter) hyperopia. Similar examples with different correcting power or with glasses correcting myopia could be used.

Figure 1:
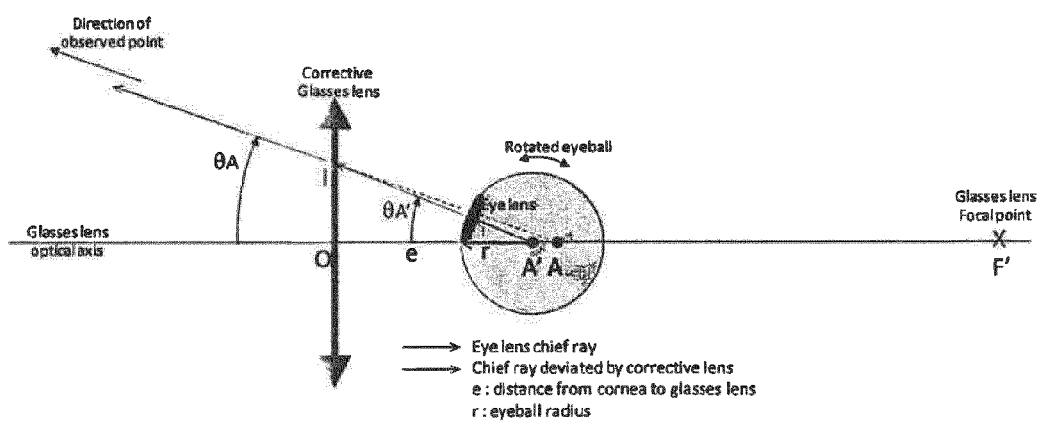
FIG. 1 represents a schema showing the influence of a convergent glasses lens on the perceived direction of an observed point.

FIG. 1 represents a schema showing the influence of a convergent eyeglass lens on the perceived direction of an observed point. The convergent eyeglass lens clearly impacts the angular disparity value of images seen by the viewer's eyes.

Indeed, FIG. 1 represents the example of a convergent glasses lens corresponding to hyperopia (or farsightedness) correction and modifying the direction of observation for an eye. Considering a fixed head position, and thus a fixed direction for the eyeglass lens optical axis, the eyeball will have to rotate of angle $\theta A'$ larger than the original $\theta A$ angle direction of the observed point.

Given the focal length of the corrective glasses lens $f'= \overline{OF'}$, the radius of the eyeball r and the distance e from the eyeball surface (cornea) to the glasses lens optical center (O), $\theta A'$ can be computed from $\theta A$ in the following manner.

Considering that $A'$ is the eyeball center of rotation and A its conjugate through the eyeglass lens, thus:

$$\overline{OA'} = e + r \quad (1)$$

$$1/\overline{OA} = 1/\overline{OA'} - 1/\overline{OF'} = 1/\overline{OA'} - 1/f' \quad (2).$$

Then comes: $\theta A' = a\tan(\overline{OA} \cdot \tan(\theta A)/\overline{OA'})$ Introducing I as the intersection between the lens glasses principal plane and the direction of observed point will help the reader as $$\overline{OI} = \overline{OA} \cdot \tan \theta A \text{ and } \overline{OI} = \overline{OA'} \cdot \tan \theta A'.$$

Although this derivation is made in a paraxial case (Gaussian approximation), it is representative of the order of magnitude the vision angle can be modified when wearing corrective glasses. Real glasses will introduce a slightly different distortion of space due to their thickness, refractive index, and surfaces radii of curvature.

In the same computation conditions corresponding to a +4 D observer wearing glasses, Table 1 displays the variation of angular direction of an observed point for a +4 D correction with a focal length $f' = \overline{OF'} = 250$ mm and for a typical eyeball radius r=9 mm and lens to cornea distance e=14 mm. In this example $\overline{OA'}=23$ mm and $\overline{OA}=25.33$ mm.

TABLE 1

| angular variations | | | | |
|---|---|---|---|---|
| $\theta A$ degrees | OI mm | $\theta A'$ degrees | $\Delta \theta A$ degrees | $\Delta \theta A$ % |
| 5 | 2.22 | 5.50 | 0.50 | 10.1% |
| 10 | 4.47 | 10.99 | 0.99 | 9.9% |
| 15 | 6.79 | 16.44 | 1.44 | 9.6% |
| 20 | 9.22 | 21.84 | 1.84 | 9.2% |
| 25 | 11.81 | 27.18 | 2.18 | 8.7% |
| 30 | 14.62 | 32.45 | 2.45 | 8.2% |

It can be evaluated from this table that such farsighted observer's oculomotor system will be more stimulated than an observer without glasses, or the same observer wearing contact lenses, the two last columns giving the amplitude of over-stimulation, in angular degrees (up to 2.45 degrees) and percentage (from 8 to 10%).

This over-stimulation potentially will affect the two eyes creating ocular muscles fatigue in excess for the farsighted person wearing glasses.

To evaluate the significance of the effect, Table 2 gives an indication of the maximum angular position of a point on a display in typical 3D viewing configurations.

TABLE 2

| | Screen Width m | Observation Distance m | Max $\theta A$ degrees |
|---|---|---|---|
| TV 40" | 1.0 | 3.0 | 9.5 |
| TV 60" | 1.5 | 3.0 | 14.0 |
| PC screen | 0.5 | 0.5 | 26.6 |
| Cinema | 10 | 15 | 18.4 |

For a 1 m width TV, a viewer at 3 m, the maximal angular position of a point is 9.5 degrees. The corresponding angular variation given by table 1 for a +4 D corrected observer is about 9.9%.

For a 10 m width cinema, a viewer at 15 m, the maximal angular position of a point is 18.4 degrees. The corresponding angular variation given by table 1 for a +4 D corrected observer is about 9.2%.

Figure 2:
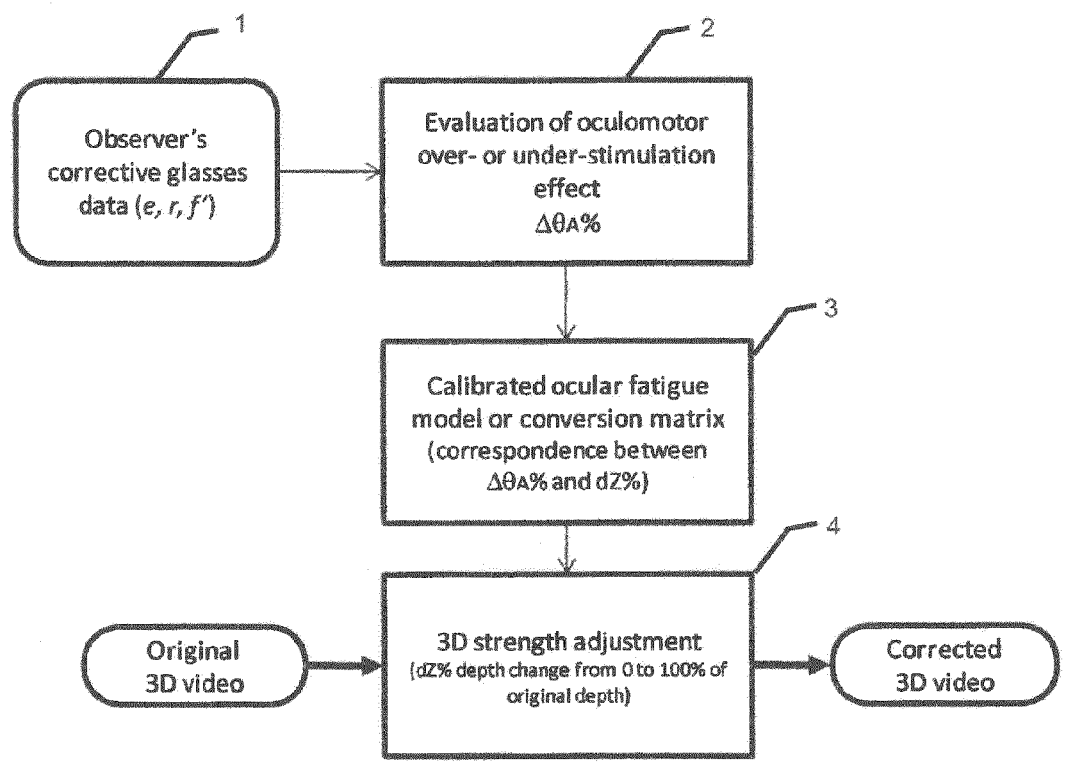
FIG. 2 is a diagram for explaining the method of the invention of 3D video adjustment depending on corrective glasses data.

Thus this evaluated over-stimulation information in degrees or percentage can be used to adapt a 3D strength adjustment module acting on a 3D video signal (see FIG. 2).

A first module will evaluate $\Delta \theta A$ in degrees or percentage as above from data provided by the observer.

Then, thanks to psycho-visual tests, a model of the excess of ocular muscle stimulation on ocular fatigue can be created to predict the 3D strength modification necessary to compensate for the glasses lens effect. This 3D strength modification in percentage dZ % is created as a function of $\Delta \theta A$. Alternatively, a conversion matrix can be built with the same purpose.

Finally the 3D strength adjustment processing will modify the 3D video content according to the computed estimated depth adjustment dZ %. One skilled in the art could use for example techniques described in the document WO2012156489 or in the document EP2547109 or in the document: "The Use of a Dense Disparity Map to Enhance Quality of Experience in Stereoscopic 3D Content." by D. Doyen et al., published in the proceedings of SMPTE 2011 conference (SMPTE stands for "Society of Motion Picture and Television Engineers") in order to obtain a 3D content with the adjusted depth.

For the case of myopia (nearsightedness) the oculomotor system will be under-stimulated compared to the situation when the observer is wearing contact lenses. In this case the 3D strength adjustment can be driven in a way to provide more depth for a same fatigue estimation. The process to do so is the same as described above for farsightedness.

The optimization applies optimally to single viewer situations.

In case of multiple viewers, a combination of the obtained 3D strength adjustment can be performed.

The combination can be e.g. the average or quadratic average or more complex formula potentially privileging the decrease of muscle stimulation.

Table 3 displays the variation of angular direction of an observed point at θA=20° of the glasses lens optical axis for different correction levels ranging from +5 D to −5 D corresponding to strong farsightedness to strong nearsightedness with e=14 mm, r=9 mm and $\overline{OA'}$=23 mm. Variations for this direction of 20° of the observed point (e.g. referenced to the sagittal plane) extent from +11.8% angular difference for which more effort is required compared to a contact lens equipped observer to −9.6% angular difference for which less effort is required.

TABLE 3

Correction variations

| Diopter correction | OF' = f' mm | OA mm | OI mm | θA' degrees | ΔθA degrees | ΔθA % |
|---|---|---|---|---|---|---|
| 5 | 200 | 25.99 | 9.46 | 22.36 | 2.36 | 11.8% |
| 4 | 250 | 25.33 | 9.22 | 21.84 | 1.84 | 9.2% |
| 3 | 333 | 24.70 | 8.99 | 21.35 | 1.35 | 6.8% |
| 2 | 500 | 24.11 | 8.77 | 20.88 | 0.88 | 4.4% |
| 1 | 1000 | 23.54 | 8.57 | 20.43 | 0.43 | 2.2% |
| −1 | −1000 | 22.48 | 8.18 | 19.58 | −0.42 | −2.1% |
| −2 | −500 | 21.99 | 8.00 | 19.19 | −0.81 | −4.1% |
| −3 | −333 | 21.52 | 7.83 | 18.80 | −1.20 | −6.0% |
| −4 | −250 | 21.06 | 7.67 | 18.43 | −1.57 | −7.8% |
| −5 | −200 | 20.63 | 7.51 | 18.08 | −1.92 | −9.6% |

Potential applications are in the domain of 3D image perception improvement on 3DTVs or 3D displays, with less ocular fatigue and more quality in the visualization of 3D content.

FIG. 2 is a block diagram for explaining the method of 3D video adjustment depending on corrective glasses data corresponding to the invention The step 1 of the method consists in obtaining the observer's corrective glasses data which are e, r and f, e being the distance between cornea to glasses lens, r being the eyeball radius and f being the focal length of the corrective glasses. These observer's corrective glasses data correspond to information about prescription glasses of the observer. They can be either determined explicitly, or just provided to the device that executes such method. The second step consists in evaluating oculomotor over- or under-stimulation effect. This evaluation of an extra-stimulation (over or under) is done in percentage corresponding to the variation of the angle formed by the direction of an observer's visual axis to the eyeglass lens optical axis corresponding to the deviation created by the glasses, the observer being subject to ocular fatigue due to this over- or under-stimulation. Therefore, such second step can be viewed as a step of calculating a value representative of the optical deviation created by the glasses from the provided information for a given direction.

In step 3, as this over- or under-stimulation is evaluated, a conversion matrix between this evaluated extra stimulation corresponding to an ocular fatigue and the 3D strength of the 3D content to be rendered is created. Such step 3 can be viewed as a step of estimating a depth adjustment value by taking into account the calculated value (in step 2). Consequently, in step 4, a 3D strength adjustment is applied to the original 3D video content corresponding to a change in percentage of the original depth thus defining a corrected 3D video content to improve the perceived quality of a 3D scene for reducing ocular fatigue. Thus, such step 4 can be viewed as a step of modifying the depth of the 3D content according to the estimated depth adjustment value.

In another embodiment of the invention, it is proposed a device for adapting 3D content to an observer wearing prescription glasses. Such device is remarkable in that it comprises:
 means for providing information about prescription glasses of the observer;
 means for calculating a value representative of the optical deviation created by the glasses from the provided information, for a given direction;
 means for estimating a depth adjustment value as a function of the calculated value and
 means for modifying the depth of the 3D content according to the estimated depth adjustment value.

In one embodiment of the invention, such device for adapting 3D content can be comprised in a 3D TV set or a 3D display. As mentioned previously, such 3D TV set or 3D display can also comprise a memory unit that can store data relative to each viewer (especially the information concerning prescription glasses of users).

In an alternative embodiment, such device for adapting 3D content can comprise memory units (for example a RAM ("Random Access Memory") block and/or a ROM ("Read Only Memory") block) and a calculation unit (for example a CPU ("Central Processing Unit") block). After powering up, the calculation unit is capable of executing instructions stored in a ROM block (or in another persistent memory unit such as an EEPROM ("Electrically-erasable programmable read-only memory") block or a FLASH block). Indeed these instructions are loaded from the ROM or an external memory, and then executed by the calculation unit.

In an alternative embodiment, some or all of the steps of the method of adapting 3D content previously described, can be implemented in hardware in a programmable FPGA ("Field Programmable Gate Array") component or ASIC ("Application-Specific Integrated Circuit") component.

In an alternative embodiment, some or all of the steps of the method of adapting 3D content previously described, can be executed on an electronic device comprising memory units and processing units.

The invention claimed is:

1. A method of adapting 3D content to a viewer wearing prescription glasses while watching said 3D content, wherein the method comprises:
 modifying a depth of said 3D content according to an estimated depth adjustment value obtained from a variation of an angle formed by a direction of a viewer's visual axis to an eyeglass lens optical axis corresponding to a deviation created by the prescription glasses, and wherein the prescription glasses are defined by parameters e, r and f, wherein e is a distance between a cornea to a prescription glasses lens, r is an eyeball radius, and f is a focal length of the prescription glasses.

2. The method of adapting 3D content as claimed in claim 1 wherein the deviation is calculated in angular degrees or in percentage.

3. The method of adapting 3D content as claimed in claim 1 wherein the depth adjustment value is estimated to compensate for the deviation.

4. The method of adapting 3D content as claimed in claim 1 wherein the depth adjustment value is estimated by a conversion matrix to compensate for the deviation.

5. The method of adapting 3D content as claimed in claim 1 wherein the prescription glasses intend to correct myopia of the viewer.

6. The method of adapting 3D content as claimed in claim 1 wherein the prescription glasses intend to correct hyperopia of the viewer.

7. The method of adapting 3D content as claimed in claim 1 wherein said focal length is deduced from an output of face analysis software for the viewer.

8. A device for adapting 3D content to a viewer wearing prescription glasses
wherein the device comprises:
a calculation unit configured to modify depth of said 3D content according to an estimated depth adjustment value obtained from a variation of an angle formed by a direction of a viewer's visual axis to an eyeglass lens optical axis corresponding to a deviation created by the prescription glasses, and wherein the prescription glasses are defined by parameters e, r and f, wherein e is a distance between cornea to prescription glasses lens, r is the eyeball radius, and f is a focal length of the prescription glasses.

9. The device for adapting 3D content as claimed in claim 8, wherein the deviation is calculated in angular degrees or in percentage.

10. The device for adapting 3D content as claimed in claim 8, wherein the depth adjustment value is estimated to compensate for the deviation.

11. The device for adapting 3D content as claimed in claim 8, wherein the depth adjustment value is estimated by a conversion matrix to compensate for the deviation.

12. The device for adapting 3D content as claimed in claim 8, wherein the prescription glasses intend to correct myopia of the viewer.

13. The device for adapting 3D content as claimed in claim 8, wherein the prescription glasses intend to correct hyperopia of the viewer.

14. The device for adapting 3D content as claimed in claim 8, wherein said focal length is deduced from an output of face analysis software for the viewer.

* * * * *